United States Patent
Cheong et al.

(10) Patent No.: US 11,781,496 B2
(45) Date of Patent: Oct. 10, 2023

(54) AGRICULTURAL WORK VEHICLE

(71) Applicant: LS MTRON LTD., Anyang-si (KR)

(72) Inventors: Seung Ho Cheong, Anyang-si (KR); Sun Gi An, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 0 days.

(21) Appl. No.: 17/925,448

(22) PCT Filed: May 10, 2021

(86) PCT No.: PCT/KR2021/005795
§ 371 (c)(1),
(2) Date: Nov. 15, 2022

(87) PCT Pub. No.: WO2021/230588
PCT Pub. Date: Nov. 18, 2021

(65) Prior Publication Data
US 2023/0184182 A1    Jun. 15, 2023

(30) Foreign Application Priority Data

May 15, 2020    (KR) .......................... 10-2020-0058427
May 4, 2021    (KR) .......................... 10-2021-0057621

(51) Int. Cl.
*F02D 29/02*    (2006.01)
*F02D 29/00*    (2006.01)
*B60R 11/00*    (2006.01)

(52) U.S. Cl.
CPC ........ *F02D 29/00* (2013.01); *B60K 2370/152* (2019.05); *B60K 2370/167* (2019.05); *B60R 2011/0038* (2013.01)

(58) Field of Classification Search
CPC ................................. F02D 29/00; F02D 29/02
(Continued)

(56) References Cited

U.S. PATENT DOCUMENTS

| 8,352,155 B2 * | 1/2013 | Schindler .............. F02D 41/021 |
| | | 123/436 |
| 2010/0138118 A1 * | 6/2010 | Tsukada ................ E02F 9/2066 |
| | | 701/50 |

(Continued)

FOREIGN PATENT DOCUMENTS

| JP | H11264464 A | 9/1999 |
| JP | 2001343060 A | 12/2001 |

(Continued)

OTHER PUBLICATIONS

International Search Report for related International Application No. PCT/KR2021/005795; dated Nov. 18, 2021; (5 pages).

(Continued)

*Primary Examiner* — Erick R Solis
(74) *Attorney, Agent, or Firm* — K&L Gates LLP (57) ABSTRACT

The present disclosure relates to an agricultural work vehicle comprising: a vehicle body supporting an engine; a hydraulic transmission for changing speed with respect to the drive generated by the engine; an HST pedal which is connected to a swash plate control shaft of the hydraulic transmission and rotates the swash plate control shaft; a sensor unit which is directly coupled to the swash plate control shaft, and senses the rotation of the swash plate control shaft to acquire sensing values; and a control unit for controlling the rotation speed of the engine according to the sensing values.

9 Claims, 10 Drawing Sheets

(58) Field of Classification Search
USPC .................. 123/319, 339.16, 361; 701/110
See application file for complete search history.

(56) References Cited

U.S. PATENT DOCUMENTS

2016/0280222 A1* 9/2016 Ono ..................... B60W 20/00
2018/0142770 A1   5/2018 Kato et al.

FOREIGN PATENT DOCUMENTS

KR   20090031042 A   3/2009
KR   20150073060 A   6/2015

OTHER PUBLICATIONS

Written Opinion for related International Application No. PCT/KR2021/005795; dated Nov. 18, 2021; (6 pages).

* cited by examiner

# AGRICULTURAL WORK VEHICLE

CROSS-REFERENCE TO RELATED APPLICATION

The present application is a National Stage of International Application No. PCT/KR2021/005795, filed on May 10, 2021, which claims priority to and the benefit of Korean Utility Model Application No. 10-2020-0058427, filed on May 15, 2020; and Korean Utility Model Application No. 10-2021-0057621, filed May 4, 2021 the disclosures of which are incorporated herein by reference in their entirety.

FIELD

The present disclosure relates to an agricultural work vehicle used to cultivate crops required for human life using land.

BACKGROUND

Agricultural work vehicles are used for cultivating crops necessary for human life using the land. For example, combines, tractors, rice planting machines, and the like corresponds to agricultural work vehicles. Combines harvest and thresh crops such as rice, barley, wheat, and soybeans. Tractors perform work necessary for growing crops using a tractive force. Rice planting machines perform an operation of transplanting seedlings grown in rice seedbeds or seedling boxes to a paddy field.

Figure 1:
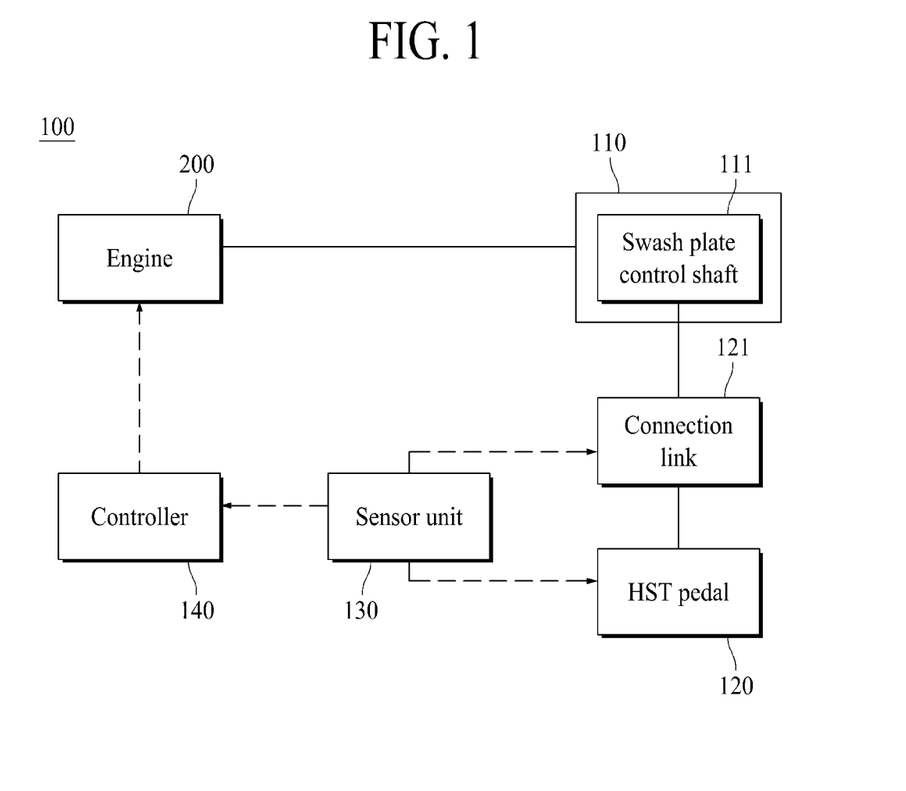
FIG. 1 is a schematic block diagram of an agricultural work vehicle according to a related art.

FIG. 1 is a schematic block diagram of an agricultural work vehicle according to a related art.

Referring to FIG. 1, an agricultural work vehicle 100 according to the related art includes a hydrostatic transmission (HST) 110 that performs gear shifting with respect to driving generated by an engine 200, an HST pedal 120 connected to a swash plate control shaft 111 of the HST 110, a sensor unit 130 that detects rotation of the HST pedal 120, and a controller 140 that controls the number of rotations (RPM) of the engine 200 according to the detected value of the sensor unit 140130. The HST pedal 120 is connected to the swash plate control shaft 111 through a connection link 121 using a linkage.

When a driver operates the HST pedal 120, the HST pedal 120 rotates to rotate the swash plate control shaft 111 through the connection link 121 so that the HST 110 performs the gear shifting. In this case, the sensor unit 130 detects the rotation of the HST pedal 120 to acquire the detected value. The sensor unit 130 may directly detect the rotation of the HST pedal 120 or indirectly detect the rotation of the HST pedal 120 by detecting movement of the connection link 121. When the sensor unit 130 acquires the detected value, the controller 140 controls the number of rotations of the engine 200 according to the detected value. Accordingly, the agricultural work vehicle 100 according to the related art controls the number of rotations of the engine 200 to correspond to the gear shifting performed by the HST 110.

In the agricultural work vehicle 100 according to the related art, in controlling the number of rotations of the engine 200, the sensor unit 130 is implemented to use the detected value obtained by detecting the rotation of the HST pedal 120 or the movement of the connection link 121. However, the HST pedal 120 is connected to the swash plate control shaft 111 through the connection link 121. Thus, in the agricultural work vehicle 100 according to the related art, the detected value may not be accurate due to a manufacturing deviation and complexity of a structure of the connection link 121 connecting the swash plate control shaft 111 and the HST pedal 120.

Accordingly, in the agricultural work vehicle 100 according to the related art, a dead section for the detected value should be large. In this case, when the detected value is present within the dead section because the degree of operation of the HST pedal 120 is small, the controller 140 is implemented so as not to reflect the detected value in controlling the number of rotations of the engine 200. Only when the detected value exceeds the dead section according to the operation of the HST pedal 120, the controller 140 is implemented to control the number of rotations of the engine 200 using the detected value. Thus, in the agricultural work vehicle 100 according to the related art, when the degree of operation of the HST pedal 120 is small, the detected value cannot be reflected in controlling the number of rotations of the engine 200, and thus the accuracy of controlling the number of rotations of the engine 200 is low.

Further, in a transmission process in which an operational force for the HST pedal 120 is transmitted to the swash plate control shaft 111 through the rotation of the HST pedal 120 and the movement of the connection link 121, the operational force is lost due to a manufacturing deviation, an operation deviation, or the like, and thus a deviation inevitably occurs between the amount of operation for the HST pedal 120 and an actual amount of operation of a swash plate of the HST 110. In this case, in the agricultural work vehicle 100 according to the related art, since the detected value obtained by detecting the rotation of the HST pedal 120 or the movement of the connection link 121 by the sensor unit 130 is used, the deviation occurring between the amount of operation of the HST pedal 120 and the actual amount of operation of the swash plate of the HST 110 is inevitably reflected in the detected value. Thus, in the agricultural work vehicle 100 according to the related art, the deviation occurs between the detected value and the actual amount of operation of the swash plate, and thus accuracy is low in interlocking the gear shifting performed by the HST 110 with the number of rotations of the engine 200.

SUMMARY

The present disclosure is designed to solve the above problems and is for providing an agricultural work vehicle which can reduce a dead section with respect to a detected value obtained by detecting gear shifting performed by a hydrostatic transmission (HST).

The present disclosure is for providing an agricultural work vehicle capable of reducing influence of a deviation, occurring between the amount of operation of an HST pedal and the actual amount of operation of a swash plate of the HST, on the detected value.

In order to solve the above problems, the present disclosure may include the following configurations.

An agricultural work vehicle according to the present disclosure includes a vehicle body configured to support an engine, a hydrostatic transmission (HST) configured to perform gear shifting with respect to driving generated by the engine, an HST pedal connected to a swash plate control shaft of the HST and configured to rotate the swash plate control shaft, a sensor unit directly coupled to the swash plate control shaft and configured to detect rotation of the swash plate control shaft to acquire a detected value, and a controller configured to control the number of rotations of the engine according to the detected value.

According to the present disclosure, the following effects can be achieved.

The present disclosure can reduce a dead section for a detected value obtained by detecting gear shifting performed by a hydrostatic transmission (HST), and thus can improve the accuracy of operation of controlling the number of rotations of an engine to correspond to the gear shifting performed by the HST.

The present disclosure can reduce influence of a deviation, occurring between the amount of operation of an HST pedal and the actual amount of operation of a swash plate of the HST, on the detected value, and thus can improve the accuracy in interlocking the gear shifting performed by the HST and the number of rotations of the engine.

DETAILED DESCRIPTION

Hereinafter, embodiments of an agricultural work vehicle according to the present disclosure will be described in detail with reference to the accompanying drawings.

Figure 2:
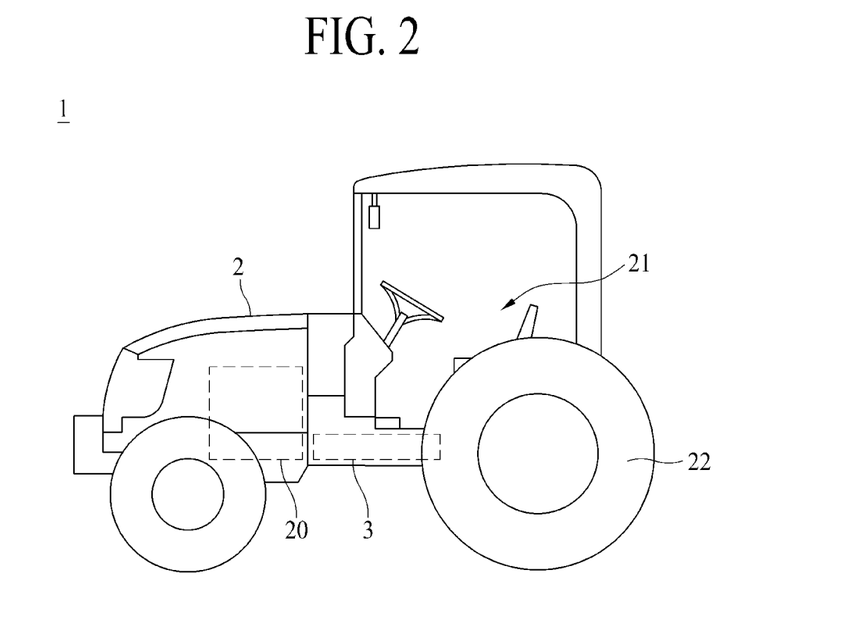
FIG. 2 is a schematic side view illustrating an example of an agricultural work vehicle according to the present disclosure.
Figure 3:
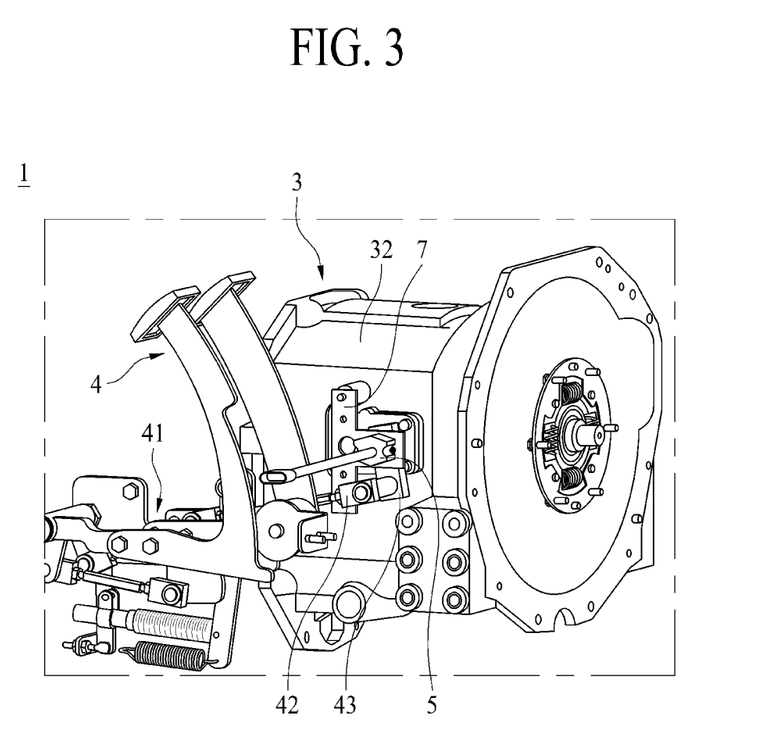
FIG. 3 is a schematic perspective view illustrating a hydrostatic transmission (HST), an HST pedal, and a sensor unit in the agricultural work vehicle according to the present disclosure.

Referring to FIGS. 2 and 3, an agricultural work vehicle 1 according to the present disclosure is used for cultivating crops necessary for human life using the land. For example, the agricultural work vehicle 1 according to the present disclosure may be a tractor, a combine, a rice planting machine, or the like.

The agricultural work vehicle 1 according to the present disclosure may include a vehicle body 2, a hydrostatic transmission (HST) 3, an HST pedal 4, a sensor unit 5, and a controller 6.

Referring to FIGS. 2 and 3, the vehicle body 2 supports an engine 20. The engine 20, the HST 3, the HST pedal 4, the controller 6, and the like may be coupled to the vehicle body 2. The vehicle body 2 is provided with a driver seat 21 on which a driver sits. Wheels 22 may be coupled to the vehicle body 2. When driving generated by the engine 20 is transmitted to the wheels 22 through the HST 3, the vehicle body 2 may travel in a traveling direction as the wheels 22 are rotated.

Referring to FIGS. 2 to 5, the HST 3 performs gear shifting for the driving generated by the engine 20. As the HST 3 performs the gear shifting, a traveling speed at which the vehicle body 2 travels may be changed. The HST 3 may perform the gear shifting using a hydrostatic motor (not illustrated) and a hydrostatic pump (not illustrated).

The HST 3 may include a swash plate control shaft 31. The swash plate control shaft 31 may be connected to a swash plate (not illustrated) of the HST 3. As the swash plate control shaft 31 rotates about a rotation axis, the swash plate may rotate. In this case, an inclination direction and an inclination angle of the swash plate may be adjusted according to a rotational direction and a rotational angle of the swash plate control shaft 31. According to an adjustment of the inclination direction and the inclination angle of the swash plate, a flow rate, a flow velocity, and the like of a working fluid circulating between the hydrostatic pump and the hydrostatic motor are also adjusted so that the gear shifting may be performed.

The swash plate control shaft 31 may protrude outward from the HST 3. In this case, the swash plate control shaft 31 may protrude outward from a mission housing 32 of the HST 3. The mission housing 32 may correspond to a case that protects components of the HST 3. The mission housing 32 may be coupled to the vehicle body 2.

Referring to FIGS. 2 to 5, the HST pedal 4 is for adjusting the traveling speed of the vehicle body 2. The HST pedal 4 may be disposed in the driver seat 21 so that a driver may operate the HST pedal 4 using the driver's foot. The HST pedal 4 may be rotatably coupled to the vehicle body 2. The HST pedal 4 may be connected to the swash plate control shaft 31. Accordingly, when the driver steps on the HST pedal 4, the HST pedal 4 may be rotated by a stepping force of the driver to rotate the swash plate control shaft 31. In this case, the HST 3 may perform the gear shifting to increase the traveling speed of the vehicle body 2. When the driver takes the driver's foot off the HST pedal 4, the HST pedal 4 may be rotated by a restoring force to rotate the swash plate control shaft 31. In this case, the HST 3 may perform the gear shifting to decrease the traveling speed of the vehicle body 2. The HST pedal 4 may be connected to the swash plate control shaft 31 through a link unit 41. The restoring force of rotating the HST pedal 4 may be provided by an elastic member such as a spring coupled to the HST pedal 4, a hydrostatic cylinder using the working fluid, or the like. The link unit 41 may transmit a rotational force according to the rotation of the HST pedal 4 to the swash plate control shaft 31 using a plurality of link members.

Referring to FIGS. 2 to 5, the sensor unit 5 detects the rotation of the swash plate control shaft 31 to acquire a detected value. The sensor unit 5 may provide the detected value to the controller 6. The controller 6 may control the number of rotations of the engine 20 according to the detected value. Accordingly, the agricultural work vehicle 1 according to the present disclosure can control the number of rotations of the engine 20 to correspond to the gear shifting performed by the HST 3.

The sensor unit 5 may be directly coupled to the swash plate control shaft 31. Accordingly, the sensor unit 5 may directly detect the rotation of the swash plate control shaft 31 to acquire the detected value. Thus, the agricultural work vehicle 1 according to the present disclosure may achieve the following effects.

First, as illustrated in FIG. 1, in the case of a comparative example in which the sensor unit 130 detects the rotation of the HST pedal 120 or the movement of the connection link 121 to indirectly detect the rotation of the swash plate control shaft 111, a dead section for the detected value of the sensor unit 130 according to the rotation of the HST pedal 120 or the movement of the connection link 121 may be large in consideration of a manufacturing deviation, an operation deviation, and the like. Thus, in the comparative example, after the detected value of the sensor unit 130 according to the rotation of the HST pedal 120 or the movement of the connection link 121 exceeds the dead section, the number of rotations of the engine 200 is controlled using the detected value. Accordingly, in the comparative example, when the degree of operation of the HST pedal 120 is small, the detected value cannot be reflected in controlling the number of rotations of the engine 200. Thus, in the comparative example, the accuracy of controlling the number of rotations of the engine 200 is low.

Further, in the comparative example, since the detected value obtained by detecting the rotation of the HST pedal 120 or the movement of the connection link 121 by the sensor unit 130 is used, the deviation occurring between the amount of operation of the HST pedal 120 and the actual amount of operation of the swash plate of the HST 110 is inevitably reflected in the detected value. Accordingly, in the comparative example, the deviation occurs between the detected value and an actual amount of operation of the swash plate, and thus accuracy is low in interlocking the gear shifting performed by the HST 110 with the number of rotations of the engine 200.

Unlike this, in the agricultural work vehicle 1 according to the present disclosure, as illustrated in FIGS. 2 to 5, the sensor unit 5 is directly coupled to the swash plate control shaft 31 to directly detect the rotation of the swash plate control shaft 31, and thus the dead section in the comparative example can be eliminated or significantly reduced. This is because the sensor unit 5 directly detects the rotation of the swash plate control shaft 31 to acquire the detected value when the swash plate control shaft 31 is rotated as the HST pedal 4 is rotated. Further, in the agricultural work vehicle 1 according to the present disclosure, the sensor unit 5 is directly coupled to the swash plate control shaft 31 to directly detect the rotation of the swash plate control shaft 31, and thus the influence of the deviation, occurring between the amount of operation of the HST pedal 4 and the actual amount of operation of the swash plate of the HST 3, on the detected value can be reduced. Thus, in the agricultural work vehicle 1 according to the present disclosure, the number of rotations of the engine 20 may be accurately controlled to correspond to the gear shifting by the HST 3, and thus the accuracy of controlling the number of rotations of the engine 20 can be improved.

Figure 5:
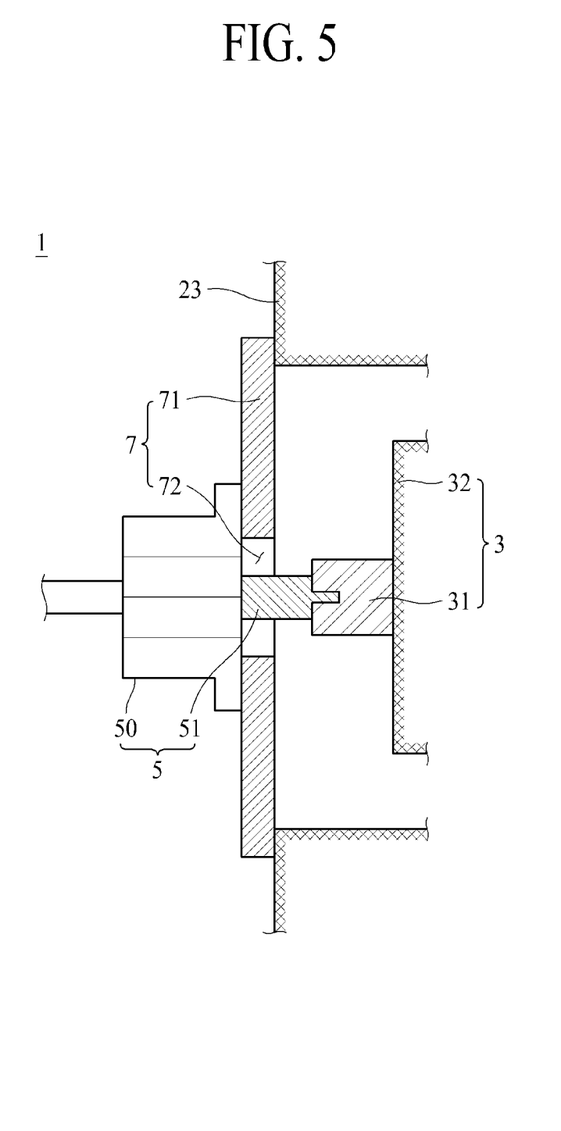
FIG. 5 is a schematic partial side cross-sectional view for describing an arrangement relationship between a swash plate control shaft, the sensor unit, and a support unit in the agricultural work vehicle according to the present disclosure.

Referring to FIG. 5, the sensor unit 5 may be disposed on a rotational center axis of the swash plate control shaft 31.

The sensor unit 5 may be directly coupled to the swash plate control shaft 31 on an extension line of the rotational center axis of the swash plate control shaft 31 to form a straight line with the swash plate control shaft 31.

Referring to FIGS. 2 to 6, the sensor unit 5 may include a detection member 51 and an acquisition mechanism 52.

The detection member 51 is coupled to the swash plate control shaft 31. The detection member 51 may be inserted into a detection groove 311 (see FIG. 6) formed in the swash plate control shaft 31. Accordingly, the detection member 51 may rotate when the swash plate control shaft 31 rotates. Thus, the sensor unit 5 may directly detect the rotation of the swash plate control shaft 31 using the detection member 51 inserted into the detection groove 311. The detection groove 311 may be implemented as a groove formed in a protrusion surface 312 of the swash plate control shaft 31. The protrusion surface 312 of the swash plate control shaft 31 may correspond to an end surface disposed in a direction in which the swash plate control shaft 31 protrudes from the mission housing 32. The entirety of the detection member 51 may be formed in a quadrangular plate shape, but the present disclosure is not limited thereto, and the detection member 51 may be formed in other shapes such as a disc shape as long as the detection member 51 may be inserted into the detection groove 311 and rotate together with the swash plate control shaft 31. The detection groove 311 may be formed in a form complementary to the detection member 51.

Figure 6:
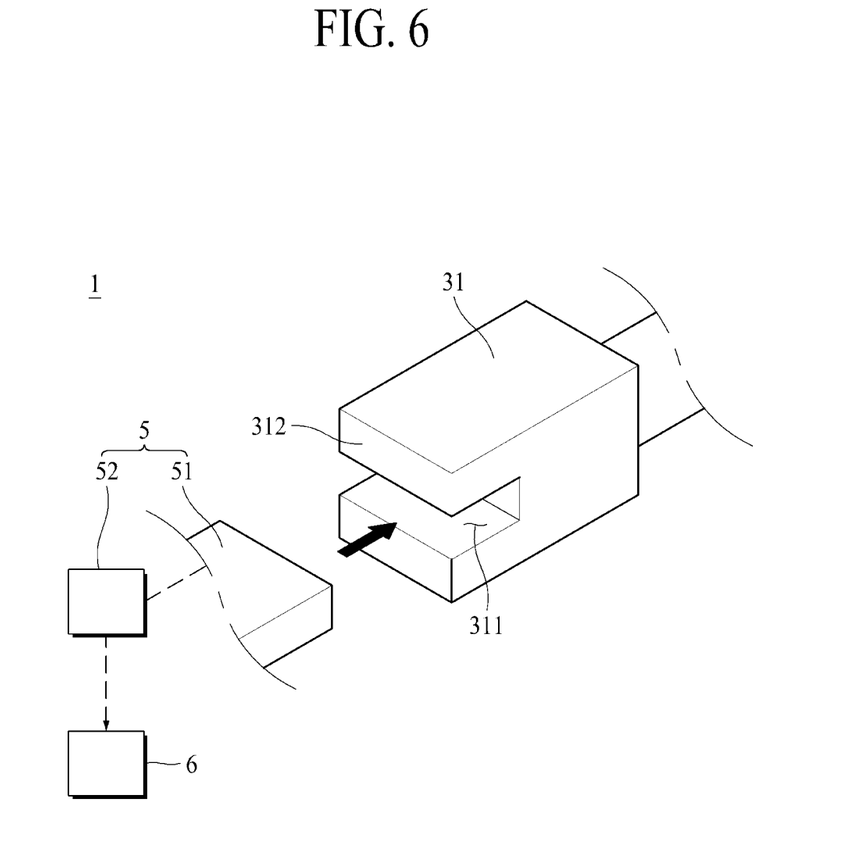
FIG. 6 is a schematic exploded perspective view of the swash plate control shaft and a detection member in the agricultural work vehicle according to the present disclosure.
Figure 7:
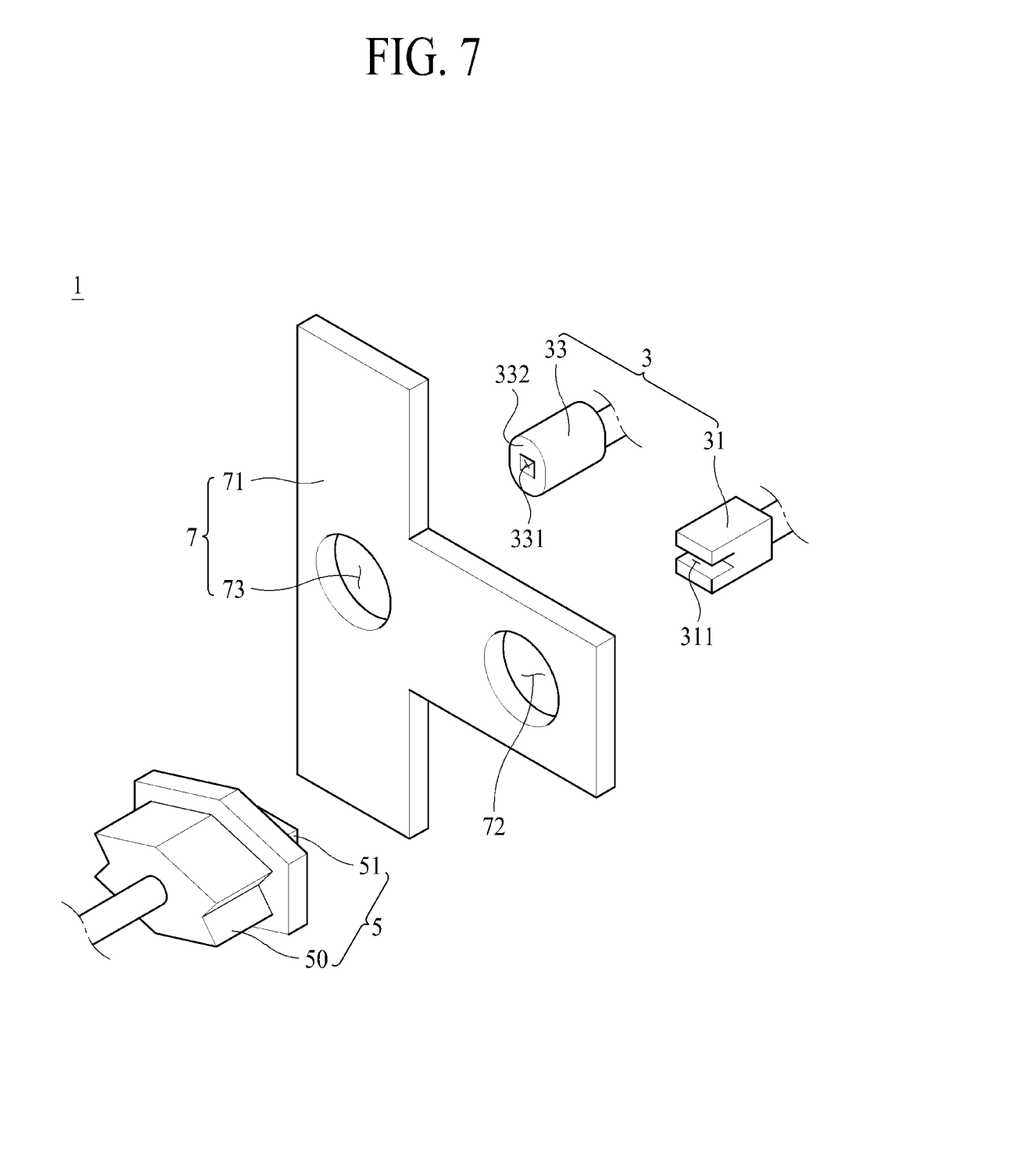
FIG. 7 is a schematic exploded perspective view of the sensor unit and the support unit in the agricultural work vehicle according to the present disclosure.

The acquisition mechanism 52 may detect the rotation of the swash plate control shaft 31 through the rotation of the detection member 51 to acquire the detected value. The acquisition mechanism 52 may be connected to the detection member 51 to detect the rotation of the detection member 51. The acquisition mechanism 52 may provide the acquired detected value to the controller 6 through wired communication, wireless communication, or the like.

Referring to FIGS. 2 to 6, the controller 6 controls the number of rotations of the engine 200 according to the detected value acquired by the sensor unit 5. After generating a control signal corresponding to the detected value, the controller 6 may transmit the control signal to control the number of rotations of the engine 200. For example, when the HST 3 performs the gear shifting to increase the traveling speed of the vehicle body 2 by rotating the swash plate control shaft 31 as the HST pedal 4 is rotated by the stepping force of the driver, the controller 6 can control the engine 200 to increase the number of rotations of the engine 200. For example, when the HST 3 performs the gear shifting to decrease the traveling speed of the vehicle body 2 as the swash plate control shaft 31 rotates as the HST pedal 4 rotates by the restoring force, the controller 6 can control the engine 200 to decrease the number of rotations of the engine 200. The controller 6 may be implemented as an electronic control unit (ECU).

Referring to FIGS. 2 to 7, the agricultural work vehicle 1 according to the present disclosure may include a support unit 7.

The support unit 7 supports the sensor unit 5. The sensor unit 5 may be maintained in a state directly coupled to the swash plate control shaft 31 by being supported by the support unit 7. The support unit 7 may be coupled to the mission housing 32. The support unit 7 may be coupled to a clutch housing 23 (see FIG. 5). The clutch housing 23 accommodates a clutch (not illustrated) of the agricultural work vehicle 1 according to the present disclosure. The support unit 7 may be coupled to at least one of the mission housing 32 and the clutch housing 23.

The support unit 7 may include a support body 71.

The support body 71 forms the overall exterior shape of the support unit 7. The support body 71 may be disposed at a position spaced apart from the mission housing 32. The swash plate control shaft 31 may be disposed between the support body 71 and the mission housing 32. The link unit 41 connected to the HST pedal 4 may be connected to the swash plate control shaft 31 between the support body 71 and the mission housing 32. In this case, the link unit 41 may be connected to the swash plate control shaft 31. The link unit 41 may rotate the swash plate control shaft 31 while moving in conjunction with the rotation of the HST pedal 4. The support body 71 may be formed in a T-shaped plate shape, but the present disclosure is not limited thereto, and the support body 71 may be formed in other shapes as long as the support body 71 may support the sensor unit 5 at a position spaced apart from the mission housing 32.

The support body 71 may support the sensor unit 5. A sensor cover 50 (see FIG. 5) of the sensor unit 5 may be coupled to the support body 71. The sensor cover 50 accommodates the detection member 51 and the acquisition mechanism 52. The detection member 51 may be disposed to protrude from the sensor cover 50. The sensor cover 50 may be coupled to the support body 71 on an opposite side to the swash plate control shaft 31 with respect to the support body 71. Accordingly, the agricultural work vehicle 1 according to the present disclosure may be implemented such that the sensor cover 50 does not interfere with the link unit 41 disposed between the support body 71 and the mission housing 32. Thus, the agricultural work vehicle 1 according to the present disclosure may be implemented such that a support force for the sensor unit 5 is secured using the coupling between the sensor cover 50 and the support body 71, and at the same time, the swash plate control shaft 31 is smoothly rotated according to the rotation of the HST pedal 4.

The support unit 7 may include a connection hole 72.

The connection hole 72 is formed to pass through the support body 71. The detection member 51 may be inserted into the connection hole 72 to be coupled to the swash plate control shaft 31 positioned on an opposite side to the sensor cover 50 with respect to the support body 71. Accordingly, the agricultural work vehicle 1 according to the present disclosure is implemented such that, even when the sensor cover is disposed so as not to interfere with the connection between the HST pedal and the swash plate control shaft 31, the detection member 51 may directly detect the rotation of the swash plate control shaft 31 through the connection hole 72. The entirety of the connection hole 72 may be formed in a disk shape, but the present disclosure is not limited thereto, and the connection hole 72 may be formed in other shapes such as a quadrangular shape as long as the connection hole 72 may be inserted so that the detection member 51 is coupled to the swash plate control shaft 31.

The support unit 7 may include an adjustment hole 73.

The adjustment hole 73 is formed to pass through the support body 71. The adjustment hole 73 may be disposed to face an adjustment mechanism 33 (see FIG. 7). The adjustment mechanism 33 is for adjusting a neutral position of the swash plate control shaft 31 and may be disposed to protrude from the mission housing 32. The adjustment mechanism 33 may be disposed at a position spaced apart from the swash plate control shaft 31. An adjustment groove 331 may be formed in the adjustment mechanism 33. The adjustment groove 331 may be formed in a front surface 322 of the adjustment mechanism 33. The front surface 332 is a surface of the adjustment mechanism 33 disposed to face the adjustment hole 73.

Since the adjustment hole 73 is disposed to face the adjustment mechanism 33, the agricultural work vehicle 1 according to the present disclosure is implemented such that even in a state in which the support body 71 is coupled to at least one of the mission housing 32 and the clutch housing 23, a worker may perform an adjustment operation of adjusting the neutral position of the swash plate control shaft 31 using the adjustment mechanism 33 through the adjustment hole 73. Thus, in the agricultural work vehicle 1 according to the present disclosure, an operation of separating the support body 71 is not required when the adjustment operation is performed, thereby contributing to shortening a time required for the adjustment operation as well as improving the easiness of the adjustment operation. The entirety of the adjustment hole 73 may be formed in a disk shape, but the present disclosure is not limited thereto, and the adjustment hole 73 may be formed in other shapes such as a quadrangular shape as long as the adjustment hole 73 may provide a space in which the adjustment operation may be performed. When both the adjustment hole 73 and the connection hole 72 are formed in the support body 71, the support body 71 may be disposed such that the connection hole 72 faces the swash plate control shaft 31 and the adjustment hole 73 faces the adjustment mechanism 33.

Here, the agricultural work vehicle 1 according to the present disclosure may be implemented to include a coupling member 43 (see FIGS. 8 and 9) to improve interoperability between the HST pedal 4 and the swash plate control shaft 31.

Referring to FIGS. 2 to 9, the coupling member 43 is coupled to the swash plate control shaft 31. The coupling member 43 may be coupled to the swash plate control shaft 31 to be in contact with an outer surface of the swash plate control shaft 31. Accordingly, the coupling member 43 may be coupled to the swash plate control shaft 31 so as not to interfere with the detection member 51 coupled to the protrusion surface 312 of the swash plate control shaft 31. A first link member 42 of the link unit 41 may be coupled to the coupling member 43. Accordingly, while moving according to the rotation of the HST pedal 4, the first link member 42 may rotate the swash plate control shaft 31 through the coupling member 43.

The coupling member 43 may include a coupling body 431, an insertion hole 432, a first tightening member 433, a second tightening member 434, and a fastening member 435.

The coupling body 431 is coupled to the first link member 42. The coupling body 431 may rotate as the first link member 42 moves.

The insertion hole 432 is inserted into the swash plate control shaft 31. The swash plate control shaft 31 may be inserted into the insertion hole 432 to be connected to rotate together as the coupling body 431 rotates.

Figure 8:
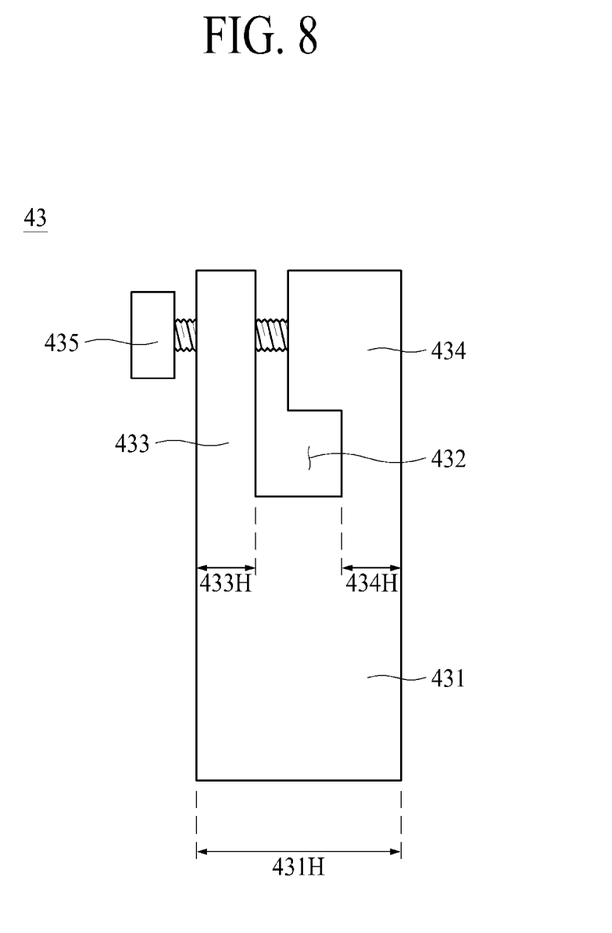
FIG. 8 is a schematic front view of a coupling member in the agricultural work vehicle according to the present disclosure.
Figure 9:
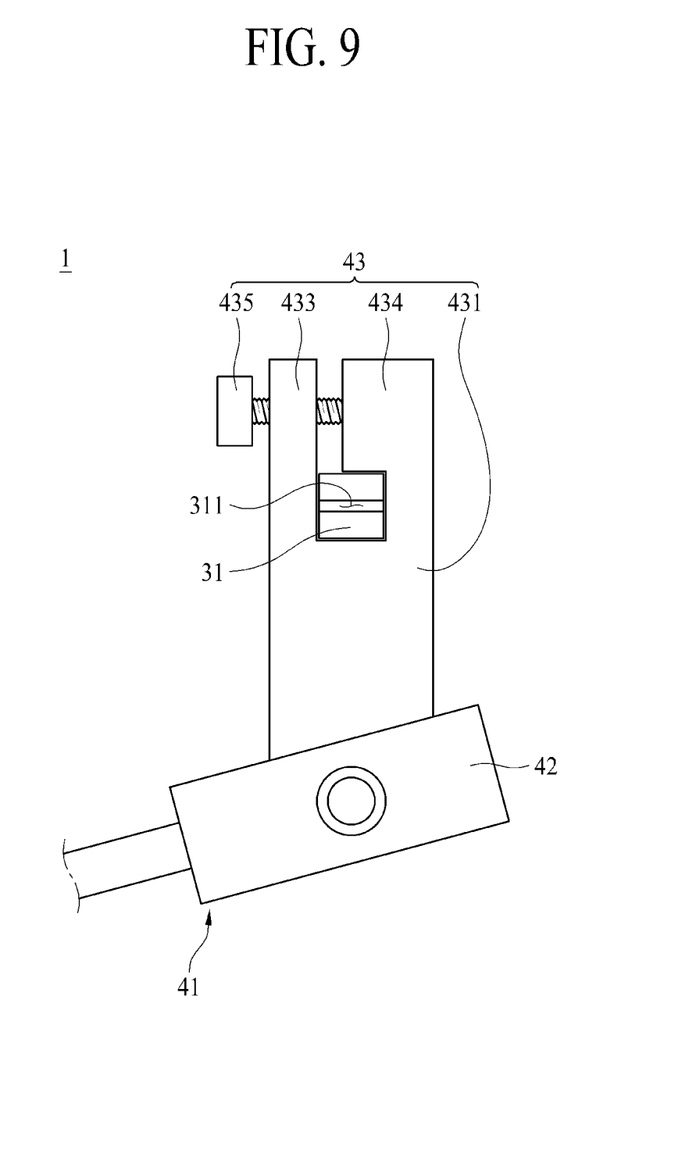
FIG. 9 is a schematic front view for describing a coupling relationship between the coupling member, the swash plate control shaft, and a first link member in the agricultural work vehicle according to the present disclosure.

The first tightening member 433 protrudes from the coupling body 431 on one side of the insertion hole 432. The first tightening member 433 may press one surface of the swash plate control shaft 31 inserted into the insertion hole 432. As illustrated in FIG. 8, a width 433H of a portion of the first tightening member 433 coupled to the coupling body 431 may be implemented to be less than a width 431H of the coupling body 431. Accordingly, the first tightening member 433 may be elastically moved with respect to a portion thereof coupled to the coupling body 431.

The second tightening member 434 protrudes from the coupling body 431 on the other side of the insertion hole 432. The second tightening member 434 may press the other surface of the swash plate control shaft 31 inserted into the insertion hole 432. As illustrated in FIG. 8, a width 434H of a portion of the second tightening member 434 coupled to the coupling body 431 may be implemented to be less than the width 431H of the coupling body 431. Accordingly, the second tightening member 434 may be elastically moved with respect to a portion thereof coupled to the coupling body 431. In this case, the insertion hole 432 may be disposed between the second tightening member 434 and the first tightening member 433. Accordingly, the coupling member 43 and the swash plate control shaft 31 may be connected to each other to rotate together using a pressing force for pressing the swash plate control shaft 31 inserted into the insertion hole 432 by the second tightening member 434 and the first tightening member 433.

The fastening member 435 is fastened to the first tightening member 433 and the second tightening member 434. The pressing force for pressing the swash plate control shaft 31 by the first tightening member 433 and the second tightening member 434 may be adjusted according to a degree to which the fastening member 435 is fastened to the first tightening member 433 and the second tightening member 434. Thus, the agricultural work vehicle 1 according to the present disclosure is implemented to improve interoperability between the coupling member 43 and the swash plate control shaft 31 using the fastening member 435, and thus a reduction in the interoperability between the coupling member 43 and the swash plate control shaft 31 due to manufacturing tolerance or the like can be prevented. For example, when the interoperability between the coupling member 43 and the swash plate control shaft 31 is low, the fastening member 435 is further fastened to the first tightening member 433 and the second tightening member 434 through rotation for fastening, and thus the first tightening member 433 and the second tightening member 434 may move in a direction closer to each other. Accordingly, the pressing force for pressing the swash plate control shaft 31 inserted into the insertion hole 432 by the first tightening member 433 and the second tightening member 434 is increased, and thus the interoperability between the coupling member 43 and the swash plate control shaft 31 can be improved. Thus, since the interoperability between the HST pedal 4 and the swash plate control shaft 31 is improved, the agricultural work vehicle 1 according to the present disclosure is implemented to more precisely and accurately adjust the swash plate control shaft 31 through the operation of the HST pedal 4.

Figure 4:
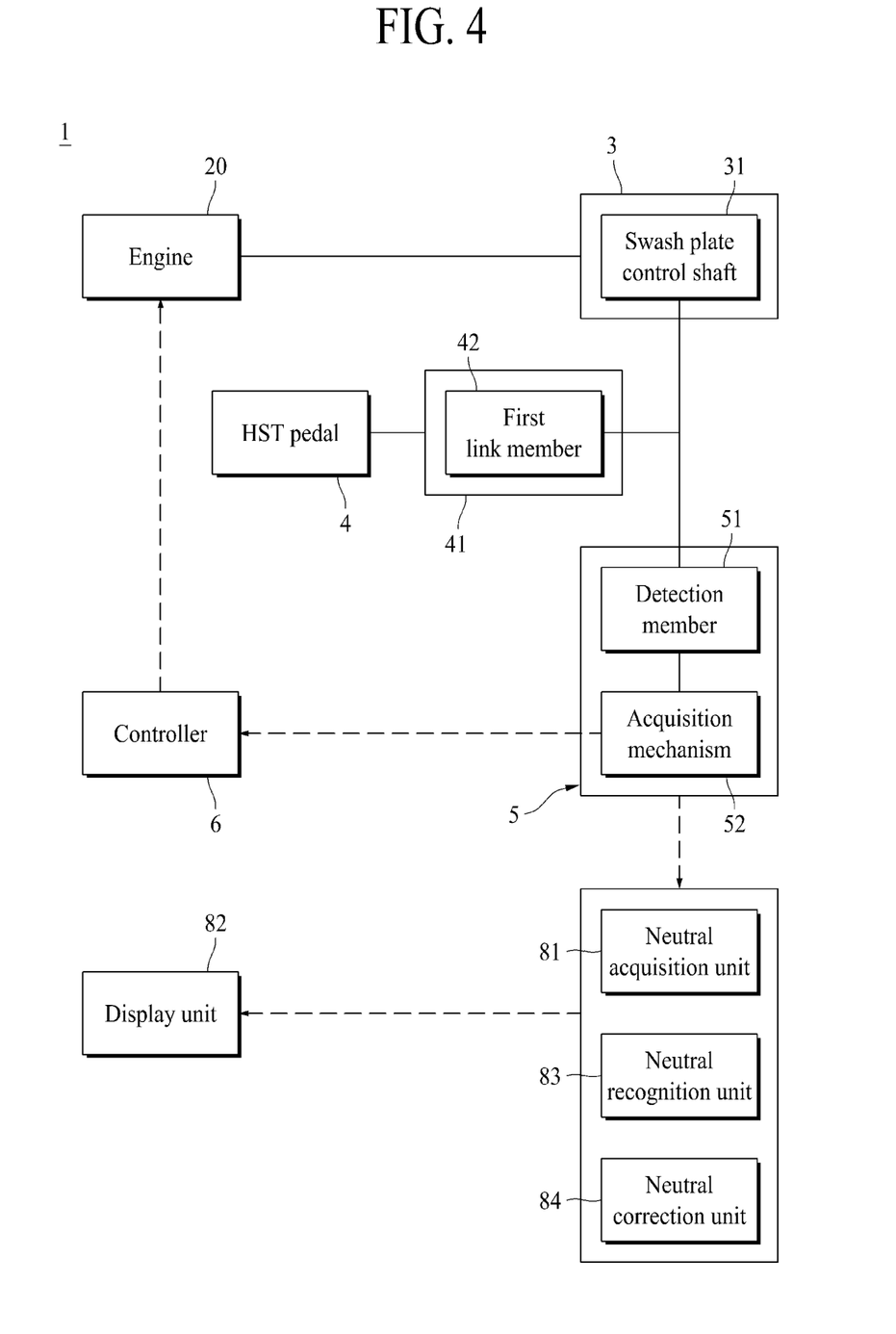
FIG. 4 is a schematic block diagram illustrating the example of the agricultural work vehicle according to the present disclosure.

Referring to FIGS. 2 to 4, the agricultural work vehicle 1 according to the present disclosure may include a neutral acquisition unit 81 and a display unit 82.

The neutral acquisition unit 81 acquires a neutral acquisition value with respect to the neutral position of the swash plate control shaft 31 using the detected value acquired by the sensor unit 5. The neutral position of the swash plate control shaft 31 may be a position of the swash plate control shaft 31 when the HST 3 is in a neutral state in which neither forward gear shifting nor rearward gear shifting is performed. The neutral acquisition unit 81 may receive the detected value from the sensor unit 5 and acquire the neutral acquisition value using the detected value. For example, the neutral acquisition unit 81 may acquire the neutral acquisition value defined as a voltage value V.

The display unit 82 displays various types of information. The display unit 82 may display the neutral acquisition value obtained by the neutral acquisition unit 81. Accordingly, the agricultural work vehicle 1 according to the present disclosure is implemented to identify the neutral acquisition value through the display unit 82, and thus the easiness of identifying the neutral position of the swash plate control shaft 31 can be improved. The display unit 82 may be installed in the driver seat 21.

Referring to FIGS. 2 to 4, the agricultural work vehicle 1 according to the present disclosure may include a neutral recognition unit 83 and a neutral correction unit 84.

The neutral recognition unit 83 stores a neutral recognition value. The neutral recognition value is a reference value for controlling the number of rotations of the engine 20. The controller 6 may control the number of rotations of the engine 20 using a difference between the neutral recognition value and the detected value. In the HST 3, a deviation in internal mechanisms may occur due to continued use. When an internal deviation of the HST 3 does not occur, the neutral recognition value and the neutral acquisition value may be the same. When the internal deviation of the HST 3 occurs, the neutral recognition value and the neutral acquisition value may be different from each other. The display unit 82 may display the neutral recognition value and the neutral acquisition value. Accordingly, the agricultural work vehicle 1 according to the present disclosure is implemented to identify whether the neutral recognition value and the neutral acquisition value are the same through the display unit 82, and thus the easiness of identifying whether the internal deviation of the HST 3 occurs can be improved. The neutral recognition value may be a value defined as a voltage value V. The display unit 82 may display at least one of the neutral recognition value and the neutral acquisition value.

The neutral correction unit 84 is for correcting the neutral recognition value and the neutral acquisition value such that the neutral recognition value and the neutral acquisition value coincide with each other. When the internal deviation of the HST 3 occurs and thus the neutral recognition value and the neutral acquisition value are different from each other, the worker may correct the neutral recognition value and the neutral acquisition value through the neutral correction unit 84 so that the neutral recognition value and the neutral acquisition value coincide with each other.

The neutral correction unit 84 may be implemented to correct the neutral recognition value. When the neutral recognition value and the neutral acquisition value are different from each other, the worker may correct the neutral recognition value through the neutral correction unit 84 so that the neutral recognition value coincides with the neutral acquisition value. Accordingly, the agricultural work vehicle 1 according to the present disclosure may be implemented such that the accuracy of an operation of controlling the number of rotations of the engine 20 to correspond to the gear shifting performed by the HST 3 only by a simple operation of correcting the neutral recognition value through the neutral correction unit 84 is maintained. When the neutral correction value is corrected through the neutral correction unit 84, the neutral recognition unit 83 stores the corrected neutral recognition value, and thus the controller 6 can control the number of rotations of the engine 20 using the corrected neutral recognition value. The display unit 82 may display the corrected neutral recognition value. In this case, the display unit 82 displays a process in which the neutral recognition value is changed through the neutral correction unit 84, and thus the easiness of correcting the neutral recognition value can be improved. For example, when it is displayed on the display unit 82 that the neutral acquisition value is 2.70 V and the neutral recognition value is 2.51 V, the worker operates the neutral correction unit 84 to correct the neutral recognition value to 2.70 V so that the neutral recognition value and the neutral acquisition value may coincide with each other. The neutral correction unit 84 may be implemented as a structure such as a button and a switch that may be operated by the worker.

Referring to FIGS. 2 to 13, the agricultural work vehicle 1 according to the present disclosure may be implemented such that, when the internal deviation of the HST 3 occurs, the neutral position of the swash plate control shaft 31 is corrected using the adjustment mechanism 33. In this case, the swash plate control shaft 31 and the adjustment mechanism 33 may be interlocked with each other inside the mission housing 32. The swash plate control shaft 31 may include a swash plate control extension shaft 313, a swash plate control connection member 314, and a swash plate driving shaft 315. The adjustment mechanism 33 may include an adjustment extension shaft 333, an adjustment connection member 334, and an adjustment eccentric shaft 335. In this case, the swash plate control extension shaft 313, the swash plate driving shaft 315, and the adjustment eccentric shaft 335 may be connected by an interlocking member 34.

Figure 10:
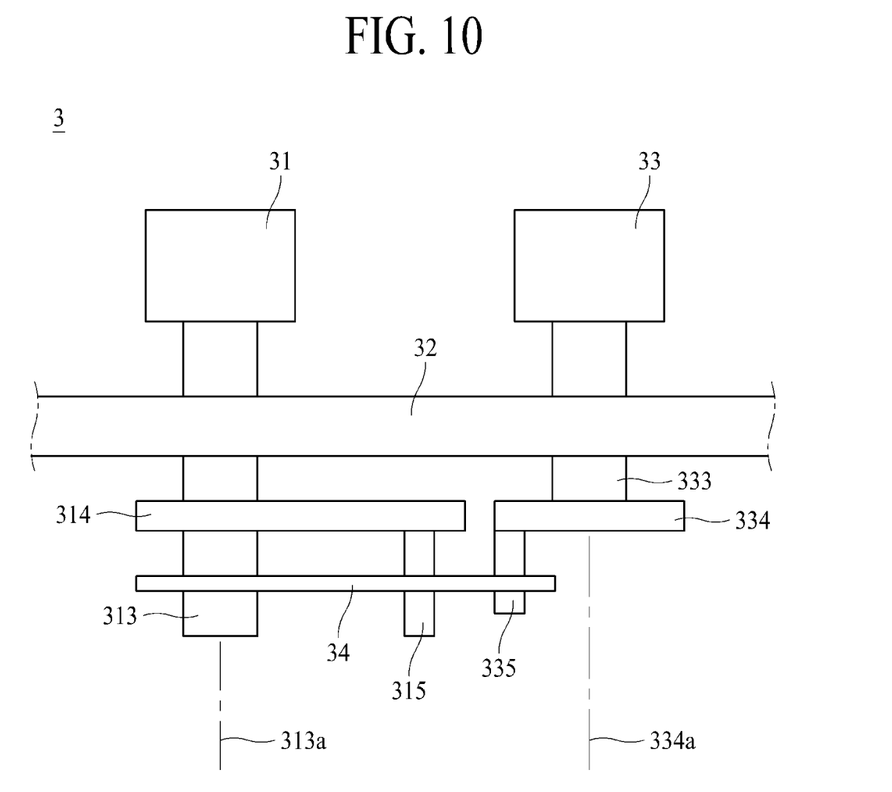
FIG. 10 is a conceptual plan view for describing a connection relationship between the swash plate control shaft and an adjustment mechanism in the agricultural work vehicle according to the present disclosure.
Figure 11:
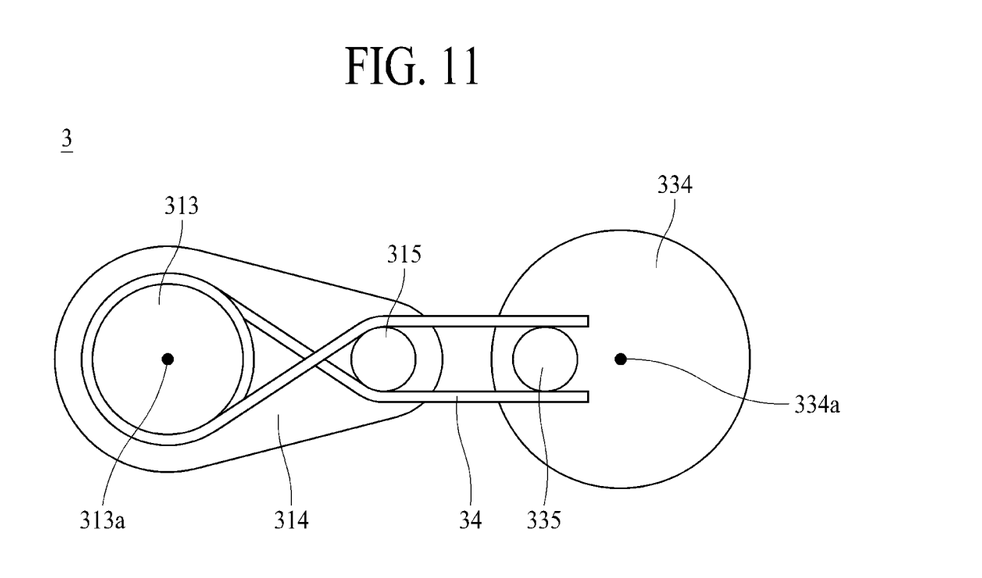
FIGS. 11 to 13 are conceptual side views for describing an operational relationship between the swash plate control shaft and the adjustment mechanism in the agricultural work vehicle according to the present disclosure.

The swash plate control extension shaft 313 protrudes from the swash plate control shaft 31. The swash plate control extension shaft 313 may protrude from the swash plate control shaft 31 and extend to be positioned inside the mission housing 32. When the swash plate control shaft 31 is rotated, the swash plate control extension shaft 313 may also be rotated. In this case, the swash plate control extension shaft 313 may rotate about a control center point 313*a*.

The swash plate control extension shaft 313 and the swash plate control shaft 31 may be formed integrally.

The swash plate control connection member 314 connects the swash plate control extension shaft 313 and the swash plate driving shaft 315. One side of the swash plate control connection member 314 may be coupled to the swash plate control extension shaft 313, and the other side thereof may be coupled to the swash plate driving shaft 315. When the swash plate control extension shaft 313 is rotated, the swash plate control connection member 314 may also be rotated. In this case, the swash plate control connection member 314 may rotate about the control center point 313*a* of the swash plate control extension shaft 313. The control center point 313*a* corresponds to a rotation center of the swash plate control extension shaft 313.

The swash plate driving shaft 315 is connected to the swash plate to rotate the swash plate. One end of the swash plate driving shaft 315 may be coupled to the swash plate control connection member 314. The other end of the swash plate driving shaft 315 may be connected to the swash plate. When the swash plate control connection member 314 rotates about the control center point 313*a*, the swash plate driving shaft 315 may rotate the swash plate while revolving about the control center point 313*a* of the swash plate control extension shaft 313. The other end of the swash plate driving shaft 315 may be connected to an actuator (not illustrated) that rotates the swash plate. In this case, when the swash plate control connection member 314 rotates, the swash plate driving shaft 315 may operate the actuator while revolving about the control center point 313*a* of the swash plate control extension shaft 313. The swash plate may be rotated by operation of the actuator.

A stepping force with which the worker operates the HST pedal 4 rotates the HST pedal 4, moves the link unit 41, rotates the swash plate control shaft 31, rotates the swash plate control extension shaft 313, rotates the swash plate control connection member 314, revolves the swash plate driving shaft 315, and finally rotates the swash plate.

The swash plate control shaft 31, the swash plate control extension shaft 313, the swash plate control connection member 314, and the swash plate driving shaft 315 may be formed integrally.

The adjustment extension shaft 333 protrudes from the adjustment mechanism 33. The adjustment extension shaft 333 may protrude from the adjustment mechanism 33 and extend to be positioned inside the mission housing 32. When the adjustment mechanism 33 is rotated, the adjustment extension shaft 333 may also be rotated. The adjustment extension shaft 333 and the adjustment mechanism 33 may be formed integrally.

The adjustment connection member 334 connects the adjustment extension shaft 333 and the adjustment eccentric shaft 335. One surface of the adjustment connection member 334 may be coupled to the adjustment extension shaft 333, and the other surface of the adjustment connection member 334 may be coupled to the adjustment eccentric shaft 335. When the adjustment extension shaft 333 is rotated, the adjustment connection member 334 may also be rotated.

One end of the adjustment eccentric shaft 335 may be coupled to the adjustment connection member 334. The adjustment eccentric shaft 335 may be disposed apart from the adjustment extension shaft 333 and an adjustment center point 334*a* of the adjustment connection member 334. The adjustment center point 334*a* corresponds to a rotation center of the adjustment extension shaft 333 and the adjustment connection member 334. When the adjustment connection member 334 is rotated about the adjustment center point 334*a*, the adjustment eccentric shaft 335 may be revolved about the adjustment center point 334*a*. That is, when the adjustment connection member 334 is rotated in place, the adjustment eccentric shaft 335 may swing about the adjustment center point 334*a*.

An operational force with which the worker adjusts the adjustment mechanism 33 through the adjustment hole 73 rotates the adjustment mechanism 33, rotates the adjustment extension shaft 333, rotates the adjustment connection member 334, and revolves the adjustment eccentric shaft 335.

The adjustment mechanism 33, the adjustment extension shaft 333, the adjustment connection member 334, and the adjustment eccentric shaft 335 may be formed integrally.

The interlocking member 34 transmits, to the swash plate driving shaft 315, the operational force transmitted through the revolution of the adjustment eccentric shaft 335. Accordingly, the interlocking member 34 may allow the adjustment eccentric shaft 335 and the swash plate driving shaft 315 to move in conjunction with each other. One side of the interlocking member 34 may be connected to the swash plate control extension shaft 313, and the other side thereof may be connected to the adjustment eccentric shaft 335. The swash plate driving shaft 315 may be disposed between the one side of the interlocking member 34 and the other side of the interlocking member 34. When the adjustment eccentric shaft 335 revolves about the adjustment center point 334*a*, the interlocking member 34 having the other side connected to the adjustment eccentric shaft 335 may rotate about the control center point 313*a* of the swash plate control extension shaft 313, and the swash plate driving shaft 315 may revolve about the control center point 313*a* of the swash plate control extension shaft 313. The interlocking member 34 may be implemented as a torsion spring.

Here, a process of correcting the neutral position of the swash plate control shaft 31 through the adjustment mechanism 33 will be described in detail below.

Figure 12:
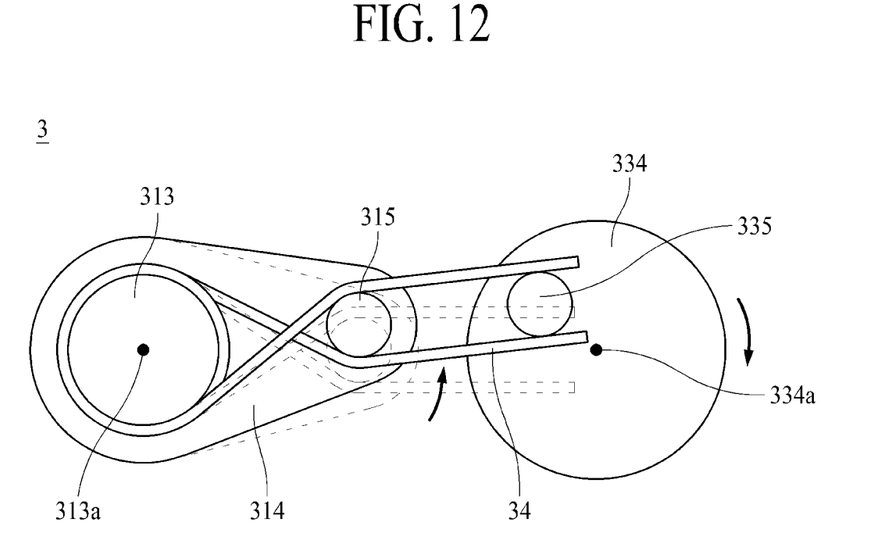

As illustrated in FIG. 12, when the adjustment connection member 334 is rotated about the adjustment center point 334a clockwise by the operational force, the adjustment eccentric shaft 335 may move the other side of the interlocking member 34 while revolving about the adjustment center point 334a clockwise. Accordingly, the interlocking member 34 may revolve the swash plate driving shaft 315 about the control center point 313a counterclockwise while rotating about the control center point 313a counterclockwise. Thus, the swash plate driving shaft 315 may swing about the control center point 313a counterclockwise. Accordingly, the swash plate control shaft 31 may be corrected counterclockwise.

Figure 13:
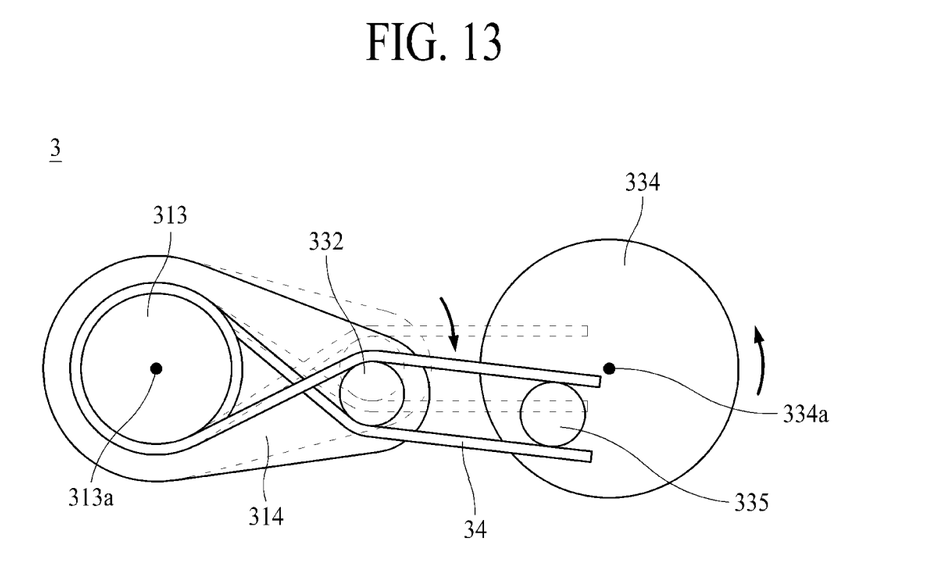

As illustrated in FIG. 13, when the adjustment connection member 334 is rotated about the adjustment center point 334a counterclockwise by the operational force, the adjustment eccentric shaft 335 may move the other side of the interlocking member 34 while revolving about the adjustment center point 334a counterclockwise. Accordingly, the interlocking member 34 may revolve the swash plate driving shaft 315 about the control center point 313a clockwise while rotating about the control center point 313a clockwise. Thus, the swash plate driving shaft 315 may swing about the control center point 313a clockwise. Accordingly, the swash plate control shaft 31 may be corrected clockwise.

When the internal deviation occurs due to continued use of the HST 3, the worker may correct the neutral position of the swash plate control shaft 31 through the adjustment mechanism 33 to prevent a malfunction of the HST 3.

Here, the agricultural work vehicle 1 according to the present disclosure may include both the adjustment mechanism 33 and the neutral correction unit 84. When the internal deviation occurs due to continued use of the HST 3, the worker can cope with the internal deviation through the adjustment mechanism 33 and the neutral correction unit 84.

The worker may correct the neutral position of the swash plate control shaft 31 to correspond to the internal deviation of the HST 3 through the operation of the adjustment mechanism 33. In this case, the neutral acquisition valve may be changed in response to the correction of the neutral position of the swash plate control shaft 31. The worker can allow the neutral recognition value and the neutral acquisition value to coincide with each other by correcting the neutral recognition value through the operation of the neutral correction unit 84.

In this way, the agricultural work vehicle 1 according to the present disclosure is implemented to include both the adjustment mechanism 33 and the neutral correction unit 84, and thus coping ability for coping with a case in which the neutral recognition value and the neutral acquisition value are different from each other can be improved.

The present disclosure described above is not limited to the above-described embodiments and the accompanying drawings, and it is apparent to those skilled in the art to which the present disclosure belongs that various substitutes, modifications, and changes can be made without departing from the technical spirit of the present disclosure.

The invention claimed is:

1. An agricultural work vehicle comprising:
a vehicle body configured to support an engine;
a hydrostatic transmission (HST) configured to perform gear shifting with respect to driving generated by the engine;
an HST pedal connected to a swash plate control shaft of the HST and configured to rotate the swash plate control shaft;
a sensor unit directly coupled to the swash plate control shaft and configured to detect rotation of the swash plate control shaft to acquire a detected value, wherein the sensor unit is disposed on a rotation center shaft of the swash plate control shaft; and
a controller configured to control a number of rotations of the engine according to the detected value.

2. The agricultural work vehicle of claim 1, wherein a detection groove into which the sensor unit is to be inserted is formed in the swash plate control shaft, and
the sensor unit includes a detection member inserted into the detection groove and rotated together with the swash plate control shaft, and an acquisition mechanism configured to detect the rotation of the swash plate control shaft through the rotation of the detection member to acquire the detected value.

3. The agricultural work vehicle of claim 1, further comprising a support unit configured to support the sensor unit, and
wherein the support unit includes a support body to which a sensor cover of the sensor unit is coupled.

4. The agricultural work vehicle of claim 3, wherein the support unit includes a connection hole formed to pass through the support body,
the sensor unit includes a detection member coupled to the swash plate control shaft, and
the detection member is inserted into the connection hole and coupled to the swash plate control shaft.

5. The agricultural work vehicle of claim 3, wherein the support unit includes an adjustment hole formed to pass through the support body, and
the adjustment hole is disposed to face an adjustment mechanism for adjusting a neutral position of the swash plate control shaft.

6. The agricultural work vehicle of claim 3, further comprising a support unit configured to support the sensor unit,
wherein the support unit is coupled to at least one of a clutch housing for accommodating a clutch and a mission housing of the HST.

7. The agricultural work vehicle of claim 1, further comprising a neutral acquisition unit configured to acquire a neutral acquisition value for a neutral position of the swash plate control shaft using the detected value.

8. The agricultural work vehicle of claim 7, further comprising:
a neutral recognition unit configured to store a neutral recognition value as a reference for controlling the number of rotations of the engine; and
a neutral correction unit configured to correct the neutral recognition value and the neutral acquisition value so that the neutral recognition value and the neutral acquisition value coincide with each other,
wherein the controller controls the number of rotations of the engine using a difference between the neutral recognition value and the detected value.

9. The agricultural work vehicle of claim 8, further comprising a display unit configured to display at least one of the neutral recognition value and the neutral acquisition value.

* * * * *